United States Patent
Hergott et al.

(10) Patent No.: US 11,674,606 B2
(45) Date of Patent: Jun. 13, 2023

(54) PROCESS CONTROL SYSTEMS AND ASSOCIATED MONOFLANGES

(71) Applicant: TESCOM CORPORATION, Elk River, MN (US)

(72) Inventors: Pat Hergott, Calgary (CA); Ed Ross, Point Blank, TX (US); Nigel Dean, Manchester (GB)

(73) Assignee: TESCOM CORPORATION, Elk River, MN (US)

( * ) Notice: Subject to any disclaimer, the term of this patent is extended or adjusted under 35 U.S.C. 154(b) by 0 days.

(21) Appl. No.: 17/156,092

(22) Filed: Jan. 22, 2021

(65) Prior Publication Data

US 2021/0222781 A1    Jul. 22, 2021

Related U.S. Application Data

(60) Provisional application No. 62/964,587, filed on Jan. 22, 2020.

(51) Int. Cl.
*F16K 11/22*     (2006.01)
*F16K 1/14*      (2006.01)
(Continued)

(52) U.S. Cl.
CPC ............. *F16K 11/22* (2013.01); *F16K 1/14* (2013.01); *F16K 11/105* (2013.01); *F16K 17/02* (2013.01);
(Continued)

(58) Field of Classification Search
CPC ............ F16K 11/22; F16L 41/06; F16L 41/16
See application file for complete search history.

(56) References Cited

U.S. PATENT DOCUMENTS 4,616,677 A * 10/1986 Krechel ................. F16K 1/305
                                                            137/878
4,711,268 A * 12/1987 Coleman ................ F16K 11/22
                                                            137/597

(Continued)

FOREIGN PATENT DOCUMENTS

CN    201 802 926 U    4/2011
WO    WO-2018/118457 A1    6/2018

OTHER PUBLICATIONS

Swagelok: "Instrument Manifold Systems Instrument, Direct and Remote-Mount Manifolds and Modular Systems," pp. 1-32, 2015, retrieved from the Internet: URL:http://www.swagelok.de/downloads/WebCatalogs/EN/MS-02-445.pdf, retrieved Jul. 12, 2016.

(Continued)

*Primary Examiner* — Reinaldo Sanchez-Medina
(74) *Attorney, Agent, or Firm* — Marshall, Gerstein & Borun LLP (57) ABSTRACT

In accordance with an example, a process control system includes a fluidic line having a longitudinal axis and including a fluidic connection. The fluidic connection has an axis angled relative to the longitudinal axis of the fluidic line. The process control system includes a primary block valve having an inlet port and an outlet port. The inlet port is coupled to the fluidic connection. The process control system includes a monoflange including a male portion forming an inlet port and including an external threaded surface. The monoflange includes an outlet and a flanged interface surrounding the outlet port of the monoflange. The monoflange includes a bleed port. The monoflange includes a bleed valve adapted to control fluid flow from the bleed port and a secondary block valve adapted to control fluid flow from the outlet port. The external threaded surface of the male portion threadably engages the outlet port of primary block valve.

22 Claims, 4 Drawing Sheets

(51) Int. Cl.
 F16K 11/10 (2006.01)
 F16K 17/02 (2006.01)
 F16K 27/02 (2006.01)
 F16K 31/60 (2006.01)
(52) U.S. Cl.
 CPC ...... *F16K 27/0245* (2013.01); *F16K 27/0263* (2013.01); *F16K 31/60* (2013.01)

(56) References Cited

U.S. PATENT DOCUMENTS

| | | | |
|---|---|---|---|
| 9,506,569 B2* | 11/2016 | Moren | F16K 1/385 |
| 10,222,302 B1 | 3/2019 | St Amant, III | |
| 10,408,353 B2* | 9/2019 | Balmforth | F16K 1/304 |
| 2005/0241694 A1* | 11/2005 | Sayers | F16L 55/1604 |
| | | | 137/318 |
| 2007/0095397 A1* | 5/2007 | Mazur | F16L 41/16 |
| | | | 137/317 |
| 2013/0092249 A1 | 4/2013 | Al-Shammari | |
| 2017/0097101 A1* | 4/2017 | Cheng | F16K 17/0473 |
| 2018/0372256 A1* | 12/2018 | Winborn | F16L 41/008 |

OTHER PUBLICATIONS

Parker "Double Block and Bleed with Ultra-Low Emission Options," 2008, retrieved from the Internet: URL:http//www.parker.com/literature/Instrumentation Products Divisioni Europe/Cat4190__FP.pdf, retrieved on May 19, 2016.

International Search Report and Written Opinion issued in PCT/US2021/014603, dated May 3, 2021.

\* cited by examiner

PROCESS CONTROL SYSTEMS AND ASSOCIATED MONOFLANGES

FIELD OF THE DISCLOSURE

The present patent relates generally to process control systems and, in particular, to process control systems and associated monoflanges.

BACKGROUND

Process control systems may include fluidic lines and different fluidic connections. Process control valves may be used to control fluid flow between the fluidic lines. Depending on the industry in which the process control systems are included, non-destructing testing may be performed on welded joints between the fluidic lines and the process control valves.

SUMMARY

In accordance with a first example, a process control system includes a fluidic line having a longitudinal axis and including a fluidic connection. The fluidic connection has an axis angled relative to the longitudinal axis of the fluidic line. The process control system includes a primary block valve having an inlet port and an outlet port. The inlet port is coupled to the fluidic connection. The process control system includes a monoflange including a male portion forming an inlet port and including an external threaded surface. The monoflange includes an outlet and a flanged interface surrounding the outlet port of the monoflange. The monoflange includes a bleed port. The monoflange includes a bleed valve adapted to control fluid flow from the bleed port and a secondary block valve adapted to control fluid flow from the outlet port. The external threaded surface of the male portion threadably engages the outlet port of the primary block valve.

In accordance with a second example, a process control system includes a fluidic line having a longitudinal axis and including a fluidic connection. The fluidic connection has an axis angled relative to the longitudinal axis of the fluidic line. The process control system includes a primary block valve having an inlet port and an outlet port. The inlet port is coupled to the fluidic connection. The process control system includes a monoflange including a male portion forming an inlet port and including an external surface. The monoflange includes an outlet and a flanged interface surrounding the outlet port of the monoflange. The monoflange includes a bleed port. The monoflange includes a bleed valve adapted to control fluid flow from the bleed port and a secondary block valve adapted to control fluid flow from the outlet port. The external surface of the male portion being welded to the outlet port of the primary block valve.

In accordance with a third example, a monoflange for use with a process control system including a primary block valve includes a male portion forming an inlet port and including an external threaded surface. The monoflange includes an outlet and a flanged interface surrounding the outlet port of the monoflange. The monoflange includes a bleed port. The monoflange includes a bleed valve adapted to control fluid flow from the bleed port. The monoflange includes a secondary block valve adapted to control fluid flow from the outlet port. The external threaded surface of the male portion is adapted to threadably engage the primary block valve of the process control system.

In accordance with a fourth example, a method includes threadably engaging an outlet port of a primary block valve with an external threaded surface of a male portion of a monoflange. The primary block valve has an inlet port coupled to a fluidic connection of a fluidic line. The monoflange includes the male portion forming an inlet port, a flanged interface surrounding an outlet port of the monoflange, and a bleed port. The monoflange further includes a bleed valve and a secondary block valve. The method includes actuating the secondary block valve to control fluid flow from the outlet port and actuating the bleed valve to control fluid flow from the bleed port.

In accordance with a fifth example, a monoflange including a male portion forming an inlet port and including an external surface. The monoflange includes an outlet and a flanged interface surrounding the outlet port of the monoflange. The monoflange includes a bleed port. The monoflange includes a bleed valve adapted to control fluid flow from the bleed port and a secondary block valve adapted to control fluid flow from the outlet port. The external surface of the male portion is adapted to be welded to the outlet port of the primary block valve.

In further accordance with the foregoing first, second, third, fourth, and/or fifth examples, an apparatus and/or method may further include any one or more of the following:

In an example, the primary block valve, the secondary block valve, and the bleed valve enable double block and bleed functionality.

In another example, the secondary block valve is positioned between the male portion forming the inlet port and the bleed valve.

In another example, the bleed valve is positioned between the flanged interface surrounding the outlet port and the secondary block valve.

In another example, the monoflange includes an integral body.

In another example, the integral body includes a one-piece forged valve body.

In another example, further including a neck flange coupled to the flanged interface of the monoflange.

In another example, further including a gasket disposed between the neck flange and the flanged interface.

In another example, further including a diaphragm seal disposed adjacent the flanged interface.

In another example, at least one of the secondary block valve or the bleed valve includes a bonnet having a bonnet flange and the monoflange includes an external monoflange surface adjacent the corresponding bonnet. Further including a seal surrounding the bonnet and positioned between the bonnet flange and the external monoflange surface.

In another example, at least one of the secondary block valve or the bleed valve include a bonnet having a central bore, external threads, and a distal portion. A stem assembly is disposed within the central bore. A body of the monoflange includes a threaded bore, a valve seat, and a portion surrounding the valve seat. The external threads of the bonnet threadably engage the threaded bore and the distal portion sealingly engages the portion surrounding the valve seat.

In another example, closing the secondary block valve prevents additional process fluid flow through the secondary block valve and toward the bleed valve.

In another example, the bleed valve and the secondary block valve are positioned in a vertical plane relative to one another.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
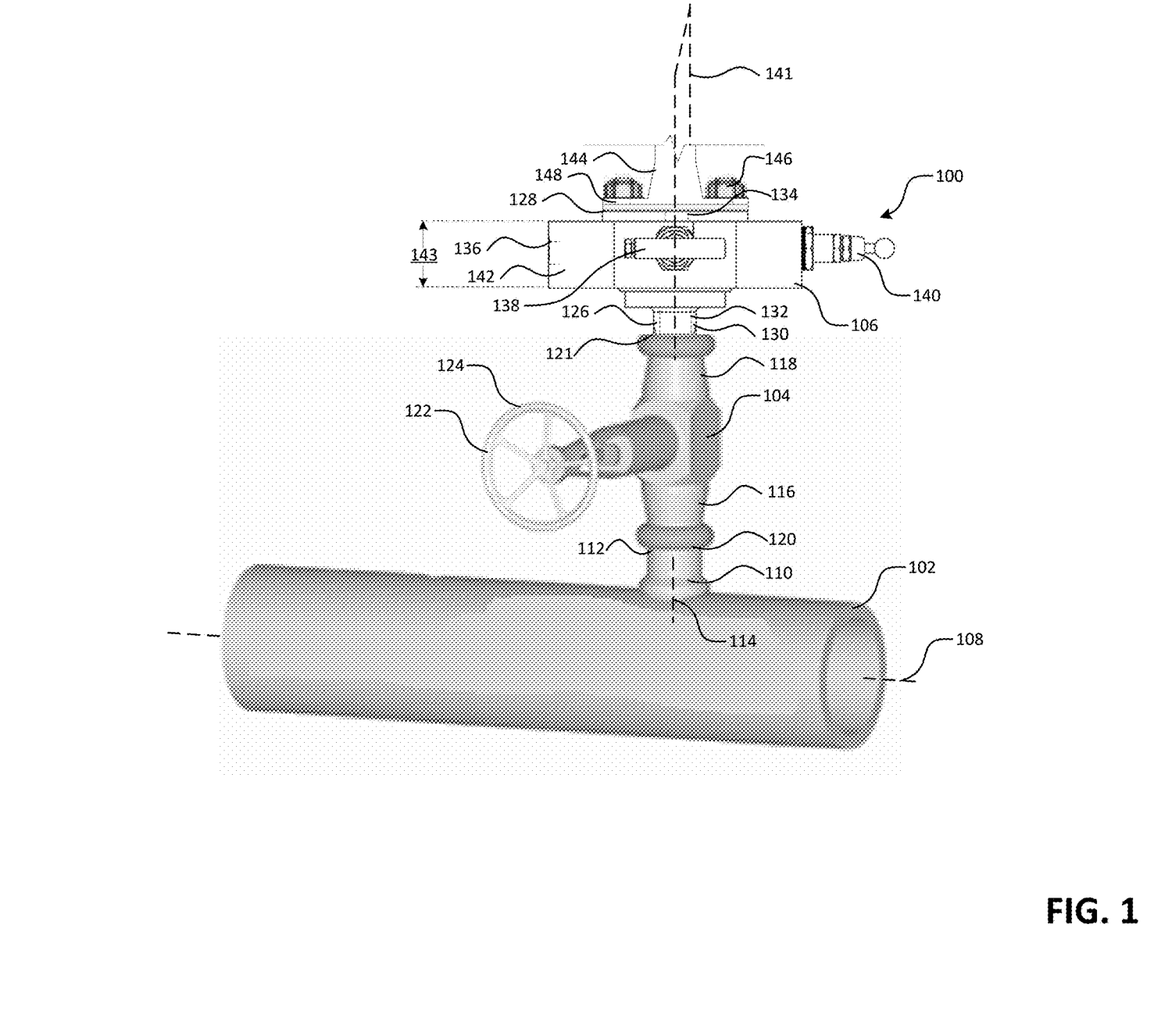
FIG. 1 illustrates a process control system assembled in accordance with a first disclosed example of the present invention.

Referring now to the drawings, FIG. 1 illustrates a process control system 100 assembled in accordance with a first disclosed example of the present invention. The process control system 100 may be used in association with oil production industries, refining industries, power generation industries, and/or chemical industries. Other applications may prove suitable.

In accordance with the disclosed example, the process control system 100 includes a fluidic line 102, a primary block valve 104, and a monoflange 106. The monoflange 106 may act as a manifold. The primary block valve 104 and the monoflange 106 are adapted to provide double block and bleed functionality to the process control system 100. The primary block valve 104 may be referred to a primary isolation valve.

In the example shown, the fluidic line 102 has a longitudinal axis 108 and includes a fluidic connection 110. The fluidic connection 110 is a T-connection having external threads 112. The fluidic connection 110 includes an axis 114 that is angled relative to the longitudinal axis 108 of the fluidic line 102. The axes 108, 114 are shown being substantially perpendicular relative to one another. However, the axes 108, 114 may be differently arranged. For example, the axes 108, 114 may be disposed at approximately 45° relative to one another.

The primary block valve 104 includes an inlet port 116 and an outlet port 118. The inlet port 116 is coupled to the fluidic connection 110. In the example shown, the inlet port 116 has internal threads 120 that threadably engage the external threads 112 of the fluidic connection 110. However, the primary block valve 104 may be coupled to the fluidic connection 110 in different ways. For example, the inlet port 116 of the primary block valve 104 may be welded to the fluidic connection 110. The outlet port 118 also includes internal threads 121 in the illustrated example.

The primary block valve 104 is illustrated as a globe valve. However, the primary block valve 104 may be a different type of valve.

The primary block valve 104 includes an actuator 122 formed as a hand wheel 124. However, the actuator 122 may be differently implemented.

In the example shown, the monoflange 106 includes a male portion 126 and a flanged interface 128. The male portion 126 opposes the flanged interface 128. The male portion 126 may be formed as a boss.

The male portion 126 forms an inlet port 130 (represented by dashed lines) and includes an external threaded surface 132. The external threaded surface 132 of the male portion 126 threadably engages the outlet port 118 of the primary block valve 104. The threaded connection between the primary block valve 104 and the monoflange 106 couples the components together. As a result of providing the monoflange 106 with the male portion 126 having the external threaded surface, the monoflange 106 can be easily fluidically coupled to the primary block valve 104 without requiring additional fluidic connections (e.g., piping) and/or without requiring a welded fluidic connection. Because a welded connection may not be present (or a number of welded connections may be reduced) in the process control system 100 as compared to some known process control systems, the disclosed examples may be field installed with less or no non-destructive testing taking place. While the above discloses threaded connections, one or more of the connections may be welded. However, other types of couplings may prove suitable.

Figure 2:
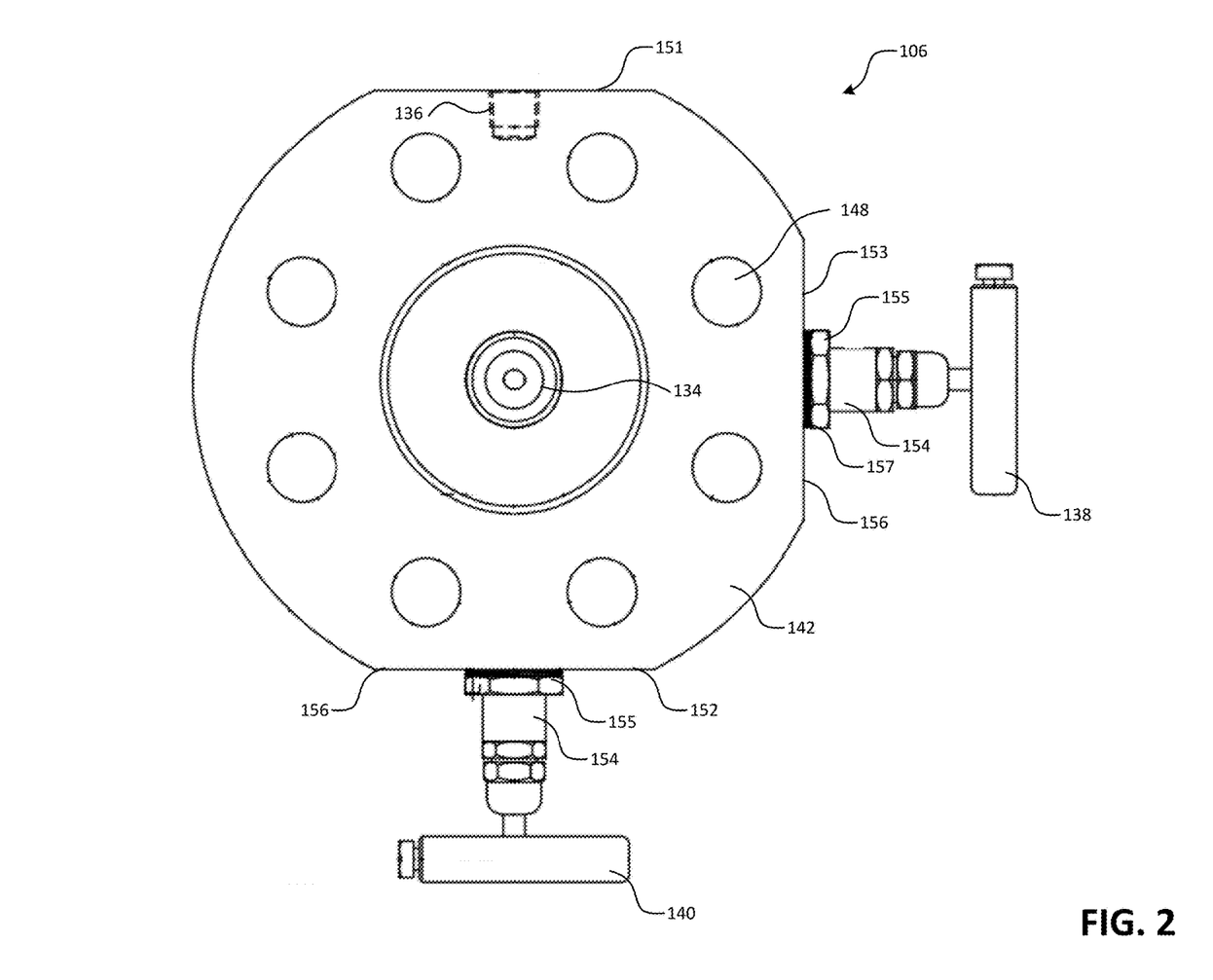
FIG. 2 illustrates a plan view of the monoflange of the process control system of FIG. 1.

Referring still to FIG. 1, the flanged interface 128 surrounds an outlet port 134 of the monoflange 106 (the outlet port 134 is more clearly shown in FIG. 2). The outlet port 134 may be used to flow process fluid to another instrument, a bleed ring, and/or a diaphragm seal.

In the example shown, the monoflange 106 also includes a bleed port 136 (represented by dashed lines). The bleed port 136 may be used to bleed pressure and/or fluid from the process control system 100 during maintenance and/or another procedure. Additionally or alternatively, the outlet port 134 and/or the bleed port 136 may be adapted to be used as an instrument port, a calibration port, and/or to provide bleed ring functionality.

The monoflange 106 also includes a bleed valve 138 and a secondary block valve 140. The bleed valve 138 and the secondary block valve 140 may be positioned in a vertical plane 141 relative to one another. The secondary block valve 140 may be referred to as a secondary isolation valve.

In the example shown, the bleed valve 138 and/or the secondary block valve 140 may be outside screw and yoke (OS&Y) needle valves. However, other types of valves may prove suitable.

The secondary block valve 140 may be referred to as an isolation valve. The secondary block valve 140 may provide for a bubble-tight shut off. The bleed valve 138 may provide for a bubble-tight shut off.

The bleed valve 138 is adapted to control fluid flow from the bleed port 136 and the secondary block valve 140 is adapted to control fluid flow from the outlet port 134. Thus, the monoflange 106 provides single block and bleed functionality. However, other arrangements may prove suitable. For example, the monoflange 106 may be adapted to provide single block functionality, double block functionality, double block and bleed functionality, and/or single block and double bleed functionality. A corresponding number of valves and ports may be provided depending on the arrangement.

In the example shown, the secondary block valve 140 is positioned between the male portion 126 forming the inlet port 130 and the bleed valve 138. The process control system 100 may be bleed after the secondary block valve 140 is closed. The bleed valve 138 is positioned between the flanged interface 128 surrounding the outlet port 134 and the secondary block valve 140. While the monoflange 106 is shown including two outlet ports (e.g., the outlet port 134 and the bleed port 136), providing the monoflange 106 with a different number of outlet ports may prove suitable. The monoflange 106 may include a number of valves that corresponds to the number of outlet ports.

The monoflange 106 includes a monoflange body 142. The monoflange body 142 may be integral. For example, the monoflange body 142 may be a one-piece forged valve body. Forming the monoflange body 142 as an integral body and/or a one-pieced forged valve body may allow the monoflange 106 to be field installed without non-destructive testing taking place in the field. Moreover, forming the monoflange body 142 as an integral body and/or a one-pieced forged valve body may reduce leak paths, may reduce the number of joints (e.g., less additional fluidic couplings/lines) within the process control system 100, may reduce an overall height 143 of the monoflange 106, and/or may reduce a weight of the monoflange 106. Because the monoflange 106 is relatively light, support brackets (e.g., additional support brackets) may not be used when installing the monoflange 106. Reducing the overall height of the monoflange 106 may provide the monoflange 106 with a relatively compact design.

In the example shown, a neck flange 144 is coupled to the flanged interface 128 of the monoflange 106. The neck flange 144 is coupled to the monoflange 106 using fasteners 146. The fasteners 146 are received in threaded bores 148 (the threaded bores 148 are more clearly shown in FIG. 2) of the monoflange body 142. Other components, such as instrumentation products, may be mounted (e.g., directly mounted) to the flanged interface 128.

A layer 150 may be disposed between the neck flange 144 and the flanged interface 128. The layer 150 may be a gasket or a diaphragm seal.

FIG. 2 illustrates a plan view of the monoflange 106 of the process control system 100 of FIG. 1. In the example shown, the bleed port 136 is positioned on a first side 151 of the monoflange body 142 and the secondary block valve 140 is positioned on a second side 152 of the monoflange body 142 opposite the first side 151. The bleed valve 138 is positioned on a third side 153 of the monoflange body 142. The third side 153 is positioned approximately 90° from the second side 152 on which the secondary block valve 140 is disposed. Other arrangements may prove suitable.

In the example shown, the bleed valve 138 and the secondary block valve 140 include a bonnet 154. The bonnet 154 includes a bonnet flange 155 and the monoflange 106 has an external monoflange surface 156 adjacent the corresponding bonnet 154. A seal 157 surrounds the bonnet 154 and is positioned between the bonnet flange 155 and the external monoflange surface 156. The seal 157 may be adapted to prevent process fluid from flowing between the external monoflange surface 156 and the bonnet 154. The seal 157 may be an O-ring.

Figure 3:
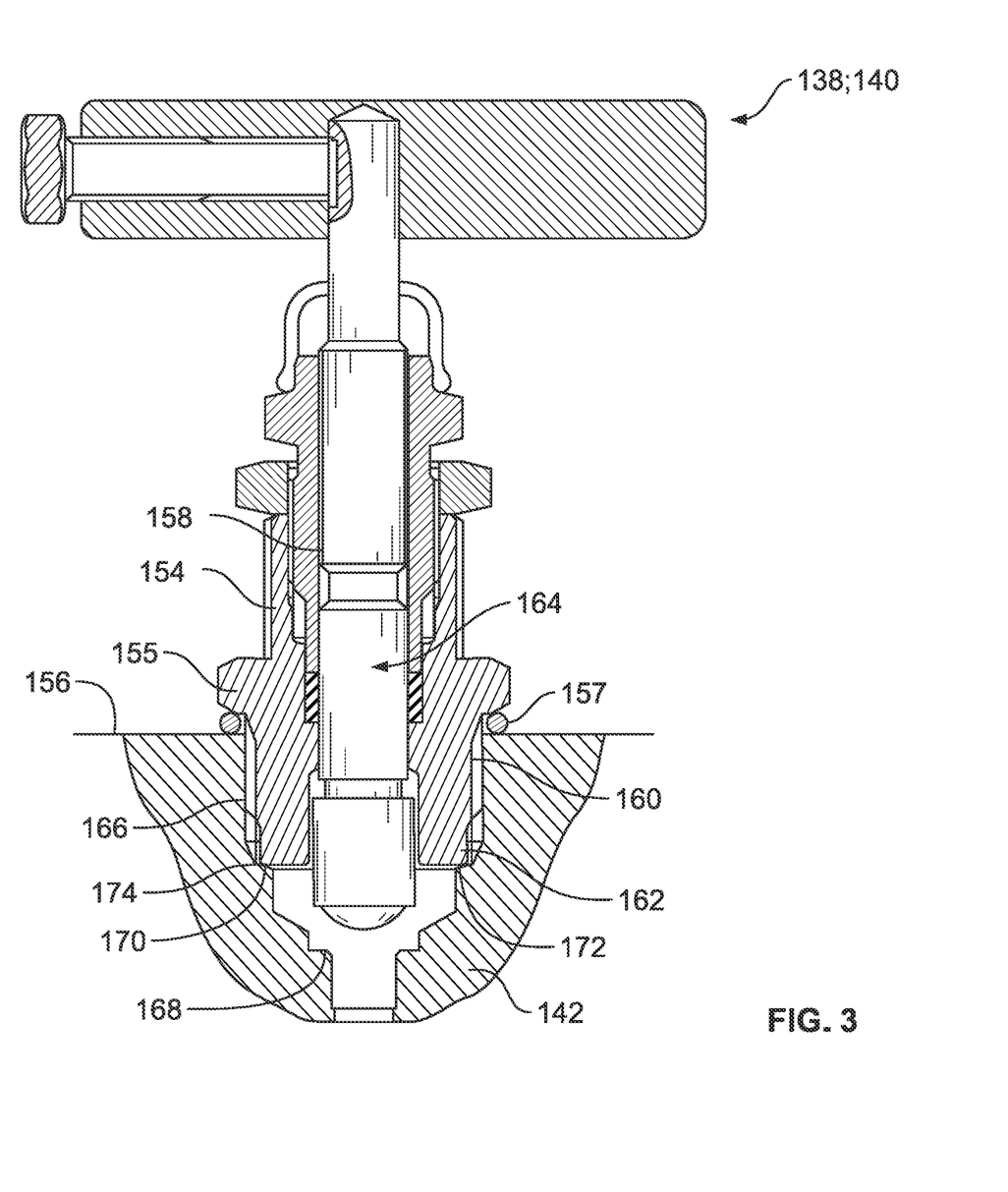
FIG. 3 illustrates a cross-sectional view of an example implementation at least one of the secondary block valve or the bleed valve that can be used with the monoflange of the process control system of FIG. 1.

FIG. 3 illustrates a cross-sectional view of an example implementation at least one of the secondary block valve 140 or the bleed valve 138 that can be used with the monoflange 106 of the process control system 100 of FIG. 1. In the example shown, the bonnet 154 includes a central bore 158, external threads 160, and a distal portion 162. A stem assembly 164 is disposed within the central bore 158 of the bonnet 154.

In the example shown, the monoflange body 142 includes a threaded bore 166, a valve seat 168, and a portion 170 surrounding the valve seat 168. The valve seat 168 is formed by the monoflange body 142 and, thus, is integral to the monoflange body 142. The portion 170 may be a step including an inwardly tapered surface 172.

The external threads 160 of the bonnet 154 threadably engage the threaded bore 166 of the monoflange body 142 and the distal portion 162 of the bonnet 154 sealingly engages the portion 170 surrounding the valve seat 168. An interface 174 between the distal portion 162 of the bonnet 154 and the portion 170 of the monoflange body 142 is a metal-to-metal seal. However, another type of seal may prove suitable. For example, a gasket may be positioned between the distal portion 162 of the bonnet 154 and the portion 170 of the monoflange body 142.

The interface 174 between the distal portion 162 and the portion 170 surrounding the valve seat 168 is spaced from the external threads 160 of the bonnet 154. As a result of the spacing, the external threads 160 may be isolated from the process fluid.

Figure 4:
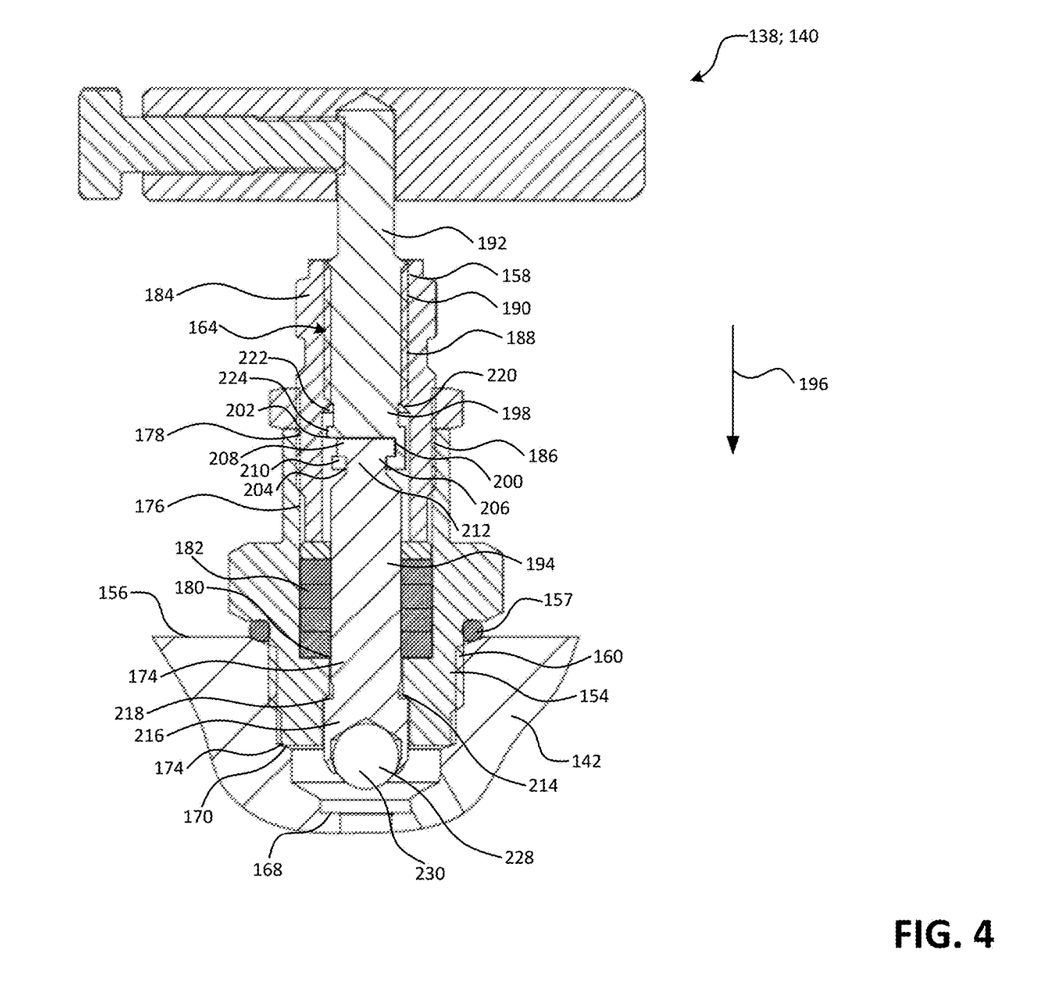
FIG. 4 illustrates a cross-sectional view of another example implementation at least one of the secondary block valve or the bleed valve that can be used with the monoflange of the process control system of FIG. 1.

FIG. 4 illustrates a cross-sectional view of another example implementation of at least one of the secondary block valve 140 or the bleed valve 138 that can be used with the monoflange 106 of the process control system 100 of FIG. 1.

In the example shown, the bonnet 154 includes the central bore 158 and the external threads 160. A central bore surface 176 defines the central bore 158. The central bore surface 176 includes internal bonnet threads 178 and defines a packing step 180.

Packing 182 is disposed within the central bore 158 adjacent the packing step 180.

A packing nut 184 is disposed within the central bore 158 and extends from the bonnet 154. The packing nut 184 includes external threads 186 that threadably engage the internal bonnet threads 178. The packing nut 184 includes a packing nut bore surface 188 that includes internal threads 190. The packing nut 184 is adapted to compress the packing 182 against the stem assembly 164.

The stem assembly 164 is disposed within the central bore 158. In contrast to the stem assembly 164 of FIG. 3, the stem assembly 164 of FIG. 4 includes an upper stem portion 192 and a lower stem portion 194. The upper stem portion 192 is rotationally coupled to the lower stem portion 194. In the example shown, rotationally coupling the upper stem portion 192 and the lower stem portion 194 allows rotational movement of the upper stem portion 192 to not correspondingly rotate (or minimally rotate) the lower stem portion 194. Not rotating or minimally rotating the lower stem portion 194 may allow increased sealing engagement between the packing 182 and the lower stem portion 194. In the example shown, rotationally coupling the upper stem portion 192 and the lower stem portion 194 allows linear movement of the upper stem portion 192 to correspondingly move the lower stem portion 194. Thus, when upper stem portion 192 is rotated and moves in a direction generally indicated by arrow 196, via the threaded engagement with the packing nut 184, the lower stem portion 194 correspondingly moves in the direction generally indicated by arrow 196.

In the example shown, the upper stem portion 192 includes a distal end 198. The distal end 198 of the upper stem portion 192 includes a slot 200. The slot 200 has a lateral opening 202 and an end opening 204.

The lower stem portion 194 includes a proximal end 206. The proximal end 206 includes a head 208 that is adapted to be received within the slot 200 of the upper stem portion 192 to rotationally couple the upper stem portion 192 and the lower stem portion 194.

The distal end 198 of the upper stem portion 192 may include a pair of space-apart prongs 210. The prongs 210 are shown defining the end opening 204. The proximal end 206 of the lower stem portion 194 includes a necked portion 212. The necked portion 212 is disposed between the prongs 210.

In the example shown, the central bore surface 176 of the bonnet 154 includes a bonnet blowout stop 214. The bonnet blowout stop 214 may be formed as an internal step. The bonnet blowout stop 214 may be internally tapered. However, the bonnet blowout stop 214 may not be internally tapered. The lower stem portion 194 includes a distal end 216. The distal end 216 of the lower stem portion 194 includes a blowout shoulder 218 that is adapted to engage the bonnet blow out stop 214.

In the example shown, the packing nut 184 includes a central internal portion 220 and a packing blowout stop 222. The packing blowout stop 222 is disposed adjacent and/or the central internal portion 220. The distal end 198 of the upper step portion 192 includes a blowout shoulder 224 that is adapted to engage the packing nut blowout stop 222.

The lower stem portion 194 includes the distal end 216. The distal end 216 of the lower stem portion 194 includes a plug 228. In the example shown, the plug 228 is a ball 230 carried by the distal end 216 of the lower stem portion 194. Other types of plugs may prove suitable.

The disclosed examples may be adapted to isolate and vent process media(s) using a single body for valving configurations and piping adaptations.

Further, while several examples have been disclosed herein, any features from any examples may be combined with or replaced by other features from other examples. Moreover, while several examples have been disclosed herein, changes may be made to the disclosed examples within departing from the scope of the claims.

What is claimed is:

1. A process control system comprising:
  a fluidic line having a longitudinal axis and comprising a fluidic connection having an axis angled relative to the longitudinal axis of the fluidic line;
  a primary block valve having an inlet port and an outlet port, the inlet port coupled to the fluidic connection and being aligned the axis of the fluidic connection; and
  a monoflange comprising:
  a male portion aligned with the axis of the fluidic connection, the male portion forming an inlet port and comprising an external threaded surface;
  an outlet port aligned with the axis of the fluidic connection;
  a flanged interface surrounding the outlet port of the monoflange and being aligned with the axis of the fluidic connection;
  a bleed port;
  a bleed valve having a valve seat disposed within and integral with a body of the monoflange and adapted to control fluid flow from the bleed port, the bleed valve having a bonnet flange mounted directly to the monoflange by a first threaded connection; and
  a secondary block valve having a valve seat disposed within and integral with the body of the monoflange and adapted to control fluid flow from the outlet port of the monoflange, the secondary block valve having a bonnet flange mounted directly to the monoflange via a second threaded connection;
  wherein the external threaded surface of the male portion threadably engages the outlet port of the primary block valve; and
  further wherein the bleed valve and the secondary block valve are oriented perpendicular to the axis of the fluidic connection.

2. The process control system of claim 1, wherein the primary block valve, the secondary block valve, and the bleed valve enable double block and bleed functionality.

3. The process control system of claim 1, wherein the secondary block valve is positioned between the male portion forming the inlet port and the bleed valve.

4. The process control system of claim 1, wherein the bleed valve is positioned between the flanged interface surrounding the outlet port and the secondary block valve.

5. The process control system of claim 1, wherein the monoflange comprises an integral body.

6. The process control system of claim 5, wherein the integral body comprises a one-piece forged valve body.

7. The process control system of claim 1, further comprising a neck flange coupled to the flanged interface of the monoflange.

8. The process control system of claim 7, further comprising a gasket disposed between the neck flange and the flanged interface.

9. The process control system of claim 1, further comprising a diaphragm seal disposed adjacent the flanged interface.

10. The process control system of claim 1, wherein at least one of the secondary block valve or the bleed valve comprise a bonnet and the monoflange comprises an external monoflange surface adjacent the corresponding bonnet, further comprising a seal surrounding the bonnet and positioned between the bonnet and the external monoflange surface.

11. The process control system of claim 1, wherein at least one of the secondary block valve or the bleed valve comprise a bonnet having a central bore, external threads, and a distal portion, further comprising a stem assembly disposed within the central bore, wherein a body of the monoflange comprises a threaded bore, a valve seat, and a portion surrounding the valve seat, and wherein the external threads of the bonnet threadably engage the threaded bore and the distal portion sealingly engages the portion surrounding the valve seat.

12. A monoflange and primary block valve assembly for use with a process control system having a fluidic line, the assembly comprising:
  a primary block valve having an inlet port and an outlet port, the inlet port of the primary block valve arranged for coupling to the fluidic line;
  a monoflange having a male portion forming an inlet port and comprising an external threaded surface, the male portion sized to be operatively coupled to the outlet of the primary block valve, thereby placing the inlet port of the male portion of the monoflange in flow communication with outlet port of the primary block valve;
  the monoflange further including:
  an outlet port;
  a flanged interface surrounding the outlet port of the monoflange;
  a bleed port,
  a bleed valve having a valve seat disposed within and integral with a body of the monoflange and adapted to control fluid flow to the bleed port, the bleed valve having a bonnet flange mounted directly to the monoflange by a first threaded connection; and a secondary block valve having a valve seat disposed within and integral with the body of the monoflange and adapted to control fluid flow from the outlet port of the monoflange, the secondary block valve having a bonnet flange mounted directly to the monoflange via a second threaded connection; and wherein the inlet port of the monoflange is operatively coupled to the outlet port of the primary block valve via the external threaded surface of the male portion.

13. The monoflange of claim 12, wherein the secondary block valve is positioned between the male portion forming the inlet port and the bleed valve.

14. The monoflange of claim 12, wherein the bleed valve is positioned between the flanged interface surrounding the outlet port of the monoflange and the secondary block valve.

15. The monoflange of claim 12, wherein the monoflange comprises an integral body.

16. The monoflange of claim 12, wherein at least one of the secondary block valve or the bleed valve comprises a bonnet and the monoflange comprises an external monoflange surface adjacent the corresponding bonnet, further comprising a seal surrounding the bonnet and positioned between the bonnet and the external monoflange surface.

17. The monoflange of claim 12, wherein at least one of the secondary block valve or the bleed valve comprise a bonnet having a central bore, external threads, and a distal portion, further comprising a stem assembly disposed within the central bore, wherein a body of the monoflange comprises a threaded bore, a valve seat, and a portion surrounding the valve seat, and wherein the external threads of the bonnet threadably engage the threaded bore and the distal portion sealingly engages the portion surrounding the valve seat.

18. The monoflange of claim 12, wherein at least one of the secondary block valve or the bleed valve comprises a bonnet, a plug, and a stem assembly including a first portion that threadably engages the bonnet and a second portion that carries the plug and is rotationally coupled to the first portion.

19. The monoflange of claim 18, wherein the first portion includes slot and the second portion includes a head that is disposed within the slot.

20. A method comprising:

threadably engaging an outlet port of a primary block valve with an external threaded surface of a male portion of a monoflange, the primary block valve having an inlet port coupled to a fluidic connection of a fluidic line, the monoflange comprising the male portion forming an inlet port, a flanged interface surrounding an outlet port of the monoflange, and a bleed port, the monoflange further comprising a bleed valve and a secondary block valve;

actuating the secondary block valve to control fluid flow from the outlet port of the monoflange; and actuating the bleed valve to control fluid flow from the bleed port;

providing the bleed valve with a valve seat disposed within and integral with a body of the monoflange and adapted to control fluid flow to the bleed port, the bleed valve having a bonnet flange, and joining the bleed valve directly to the monoflange by a first threaded connection; and providing the secondary block valve with a valve seat disposed within and integral with the body of the monoflange and adapted to control fluid flow from the outlet port of the monoflange, the secondary block valve having a bonnet flange, and mounting the bonnet flange directly to the monoflange via a second threaded connection.

21. The method of claim 20, wherein closing the secondary block valve prevents additional process fluid flow through the secondary block valve and toward the bleed valve.

22. The method of claim 20, wherein the bleed valve and the secondary block valve are substantially coplanar.

* * * * *

UNITED STATES PATENT AND TRADEMARK OFFICE
CERTIFICATE OF CORRECTION

| | |
|---|---|
| PATENT NO. | : 11,674,606 B2 |
| APPLICATION NO. | : 17/156092 |
| DATED | : June 13, 2023 |
| INVENTOR(S) | : Pat Hergott et al. |

It is certified that error appears in the above-identified patent and that said Letters Patent is hereby corrected as shown below:

On the Title Page

At page 2, in Column 1, item (56), under "OTHER PUBLICATIONS", Line 3, "Divisioni" should be -- Division --.

In the Specification

At Column 3, Line 9, "implementation" should be -- implementation of --.

At Column 3, Line 14, "implementation" should be -- implementation of --.

At Column 5, Line 4, "may be" should be -- may --.

At Column 5, Line 64, "implementation" should be -- implementation of --.

In the Claims

At Column 8, Line 64, "port," should be -- port; --.

At Column 10, Line 17, "monoflange; and" should be -- monoflange; --.

Signed and Sealed this
Second Day of July, 2024

Katherine Kelly Vidal
*Director of the United States Patent and Trademark Office*